United States Patent Office 2,735,309
Patented Feb. 21, 1956

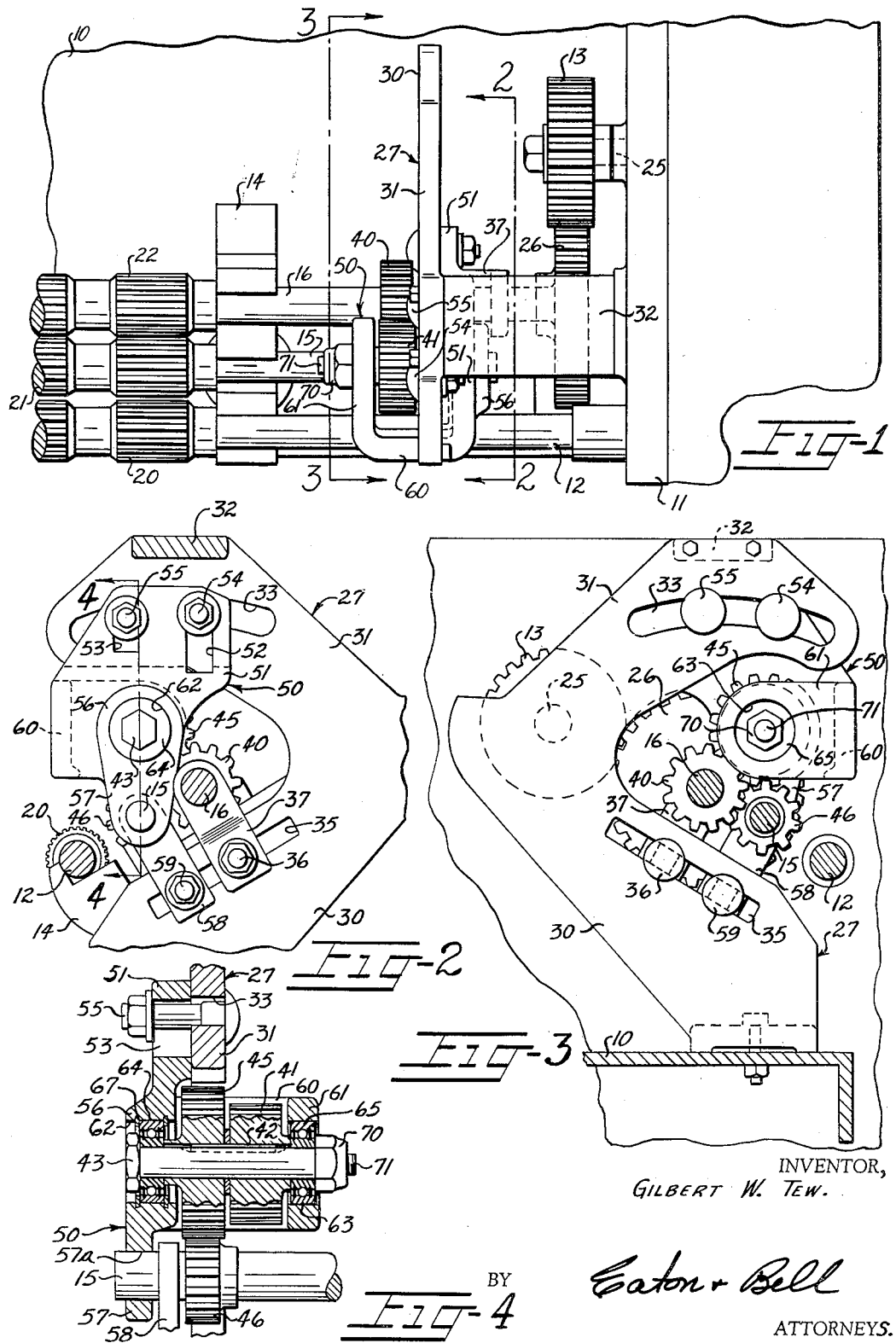

2,735,309

CHANGE GEAR SUPPORT FOR SPINNING FRAMES AND THE LIKE

Gilbert W. Tew, Spartanburg, S. C., assignor, by mesne assignments, to Deering Milliken Research Corporation, Pendleton, S. C., a corporation of Delaware Application November 22, 1952, Serial No. 322,113

6 Claims. (Cl. 74—325)

This invention relates to spinning frames and the like and, more especially to an improved means for supporting the change gears which control variations in speed between the back rolls and intermediate rolls and front rolls of a spinning frame or the like.

Heretofore, the two co-axial change gears associated with the drafting or drawing rolls of spinning frames and similar machines have been supported on a cantilevered stud extending inwardly from an upright cast bracket member depending from a slotted substantially arcuate standard extending from the spinning frame. The slotted standard facilitated adjustment of the bracket member on which the cantilevered stud was mounted so the positions of the gears could be varied relative to adjacent gears according to the variations in diameters of different change gears. The cantilevered stud heretofore used for supporting the change gears has in effect given support only at one side of the gears which was not adequate and caused the gears to sag or to be supported in an uneven manner which caused excessive and uneven wear both to the change gears and the associated gears as well as to the supporting stud. This caused frequent replacement at considerable expense as well as considerable loss of production time.

Of possibly greater importance, is the desirability of maintaining exact speed ratios between the various rolls so that the amount of draft will remain constant thus insuring uniformity in the yarns or slivers being processed. The uneven support afforded by the conventional change gear stud together with the excessive wearing of the stud and the gears caused frequent variations in and deviations from the desired roll speed ratios with the resulting lack of uniformity in the yarns or slivers being processed.

In order to overcome the above and other defects, it is an object of this invention to provide improved means for supporting the change gears which may be readily adapted to existing machines and may merely replace the conventional change gear supporting bracket heretofore employed. To this end, I have provided an improved bracket adapted to be pivotally supported at its lower end on the machine and also having its upper end adapted to be adjustably secured to the slotted arcuate standard heretofore described, the supporting bracket is generally U-shaped having spaced parallel leg portions in which anti-friction sealed bearings are mounted for supporting opposite ends of a stud on which the change gears are mounted. The stud is preferably in the form of a bolt slidably mounted in the inner races of the anti-friction bearings to permit its easy removal from the bracket for replacing the change gears thereon with gears of different sizes.

By means of this improved change gear bracket, the stud which carries the gears is supported at each of its ends, rather than at one end only, and this permits more accurate adjustment and eliminates play between the gears, thus greatly reducing wear and replacement costs and time loss caused thereby.

It is another object of the invention to provide a substantially U-shaped change gear bracket provided with anti-friction bearings therein for rotatably supporting each end of the change gear stud.

Some of the objects of the invention having been stated, other objects will appear as the description proceeds when taken in connection with the accompanying drawings in which—

Figure 1 is a fragmentary top plan view of a spinning machine or similar machine showing the improved gear change bracket affixed thereon;

Figure 2 is a fragmentary vertical sectional view, mostly in elevation, taken substantially along the line 2—2 in Figure 1 and showing one side of the improved bracket;

Figure 3 is a fragmentary vertical sectional view, mostly in elevation, taken substantially along the line 3—3 in Figure 1 and showing the other side of the improved bracket;

Figure 4 is an enlarged fragmentary vertical sectional view through the improved change gear bracket taken substantially along the line 4—4 in Figure 2;

Figure 5:
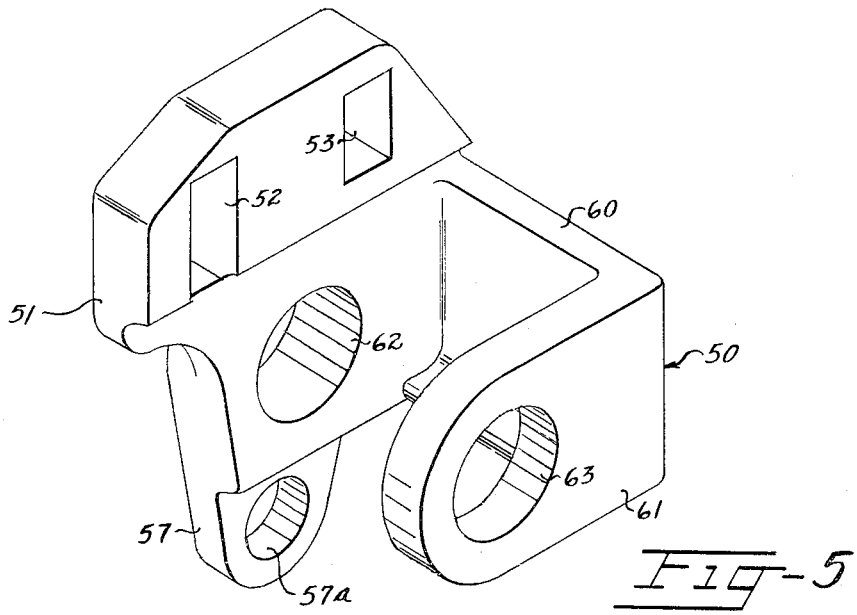
Figure 5 is an enlarged isometric view of the improved bracket removed from the spinning frame.
Figure 6:
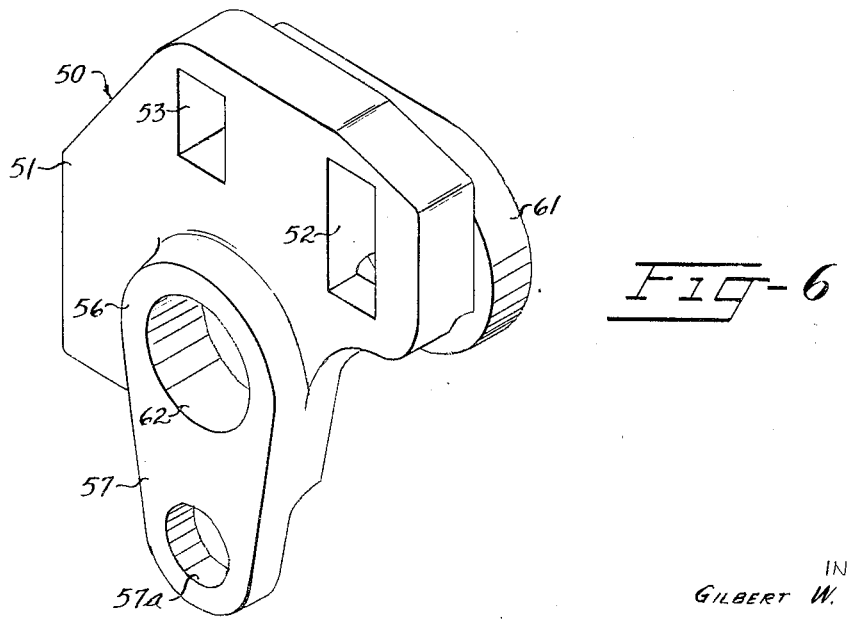
Figure 6 is an isometric view similar to Figure 5 but looking at the opposite side of the bracket.

Referring more specifically to the drawings, the numeral 10 designates a portion of a longitudinally extending frame member or roller beam of a spinning frame or the like, one end of which is suitably secured to a head end frame member 11. The head end frame member 11 has suitable gearing therein, not shown, for driving a front roll shaft 12 and a drive gear 13. The end of the roller beam 10 remote from the head end frame member 11 is connected to the foot end of the machine, not shown, in a well known manner.

The roller beam 10 supports a plurality of roll stands 14, only one of which is shown in Figure 1, and which roll stands rotatably support the front roll shaft 12, an intermediate roll shaft 15 and a back or rear roll shaft 16. The roll shafts 12, 15 and 16 have respective front intermediate and rear bottom drafting rolls 20, 21 and 22 fixed thereon and above and in engagement with which top rolls are provided for drafting textile strands. The top rolls have been omitted from the drawings for purposes of clarity.

The gear 13 is fixed on a shaft 25 and drives the rear roll shaft 16 by means of a gear 26 which is fixed on the shaft 16 and meshes with the gear 13. Spaced between the head end frame member 11 and the first roll stand 14 is an irregularly-shaped more or less arcuate standard broadly designated at 27, as shown in Figure 3, which is suitably secured to the longitudinally extending roller beam 10. The standard 27 extends upwardly from the roller beam 10 and has a rearwardly or inwardly extending upwardly inclined portion 30 and then curves forwardly to form an arm portion 31. The upper end of the arm portion 31 is rigidly supported in fixed relation to the head end frame member 11 by a bar 32 suitably secured at opposite ends thereof to the proximal surfaces of the arm portion 31 and the head end frame member 11. The portion 31 of the standard 27 has an arcuate slot 33 therein for supporting the change gear bracket.

The upwardly and rearwardly inclined portion 30 of standard 27 has an angularly disposed slot 35 therein which is penetrated by a shoulder bolt 36 for adjustably securing the rear bottom roll shaft support 37 to the standard 27. The support 37 rotatably supports an intermediate portion of the rear bottom roll shaft 16 therein.

In order to transmit rotation from the rear bottom roll shaft 16 to the intermediate bottom roll shaft 15 and to permit variations in the speed of the intermediate bottom roll shaft 15 relative to the speed of the rear bottom roll shaft 16, the shaft 16 has a relatively small gear 40 fixed thereon inwardly of the support 37 relative to the head end frame member 11.

The gear 40 meshes with an inboard change gear 41 suitably secured, as by a key 42, on a shaft or stud 43 which is shown in the form of a shoulder bolt in Figure 4. The means for rotatably supporting the change gear stud 43 is the nucleus of the present invention and will be later described in detail. Also keyed on the stud or shoulder bolt 43 is a relatively larger outboard change gear 45 which meshes with a relatively small gear 46 fixed on the intermediate bottom roll shaft 15. Thus, the change gears 41 and 45 cause the intermediate rolls 21 to rotate at a faster speed than the back rolls 22. The parts heretofore described are conventional parts of a spinning frame or the like and it is with these parts that the present improved means for supporting the change gears is adapted to be associated.

The improved means for supporting the change gears 41 and 45 comprises an improved substantially U-shaped change gear bracket broadly designated at 50 which comprises a first leg or a body portion 51 having an extension on the upper portion thereof provided with vertically extending laterally spaced slots 52 and 53 penetrated by bolts 54 and 55, respectively, which also penetrate the arcuate slot 33 in the arm portion 31 of the standard 27 to thus adjustably support the upper portion of the change gear bracket 50. The leg portion 51 of the bracket 50 has a boss 56 projecting outwardly therefrom and extending downwardly below the leg 51 to form an extension or tail portion 57 which is provided with a bore 57a in which the end of the intermediate roll shaft 15 adjacent the gear 46 is disposed to pivotally support said bracket 50. The intermediate roll shaft 15 is suitably supported as by a support 58 similar to the support 37 and by a shoulder bolt 59 which penetrates the slot 35 in the standard 27.

The change gear bracket has a web portion 60 formed integral therewith or suitably secured thereto forwardly of the boss 56. This web extends inwardly substantially parallel to the axis of the shaft 15 and the bracket then extends rearwardly to form a second leg portion 61 which may also be integral with the web 60.

The leg 61 is spaced from the leg 51 of the change gear bracket 50 and the legs 51 and 61 are provided with respective axially alined bores 62 and 63 in which the outer races of respective anti-friction or ball bearings 64 and 65 are suitably secured. The bearings 64 and 65 are preferably sealed and the bearings 65 may be fixed in the bore 63 as by a pressed fit, but preferably has a sliding fit therein and the anti-friction bearing 64 is retained in the bore 62 by any suitable means such as retaining snap rings 67 positioned in suitable grooves provided therefor in the bore 62 at opposite sides of the outer races of the anti-friction bearing 64. The shoulder bolt 43 slidably penetrates and is supported in the inner races of the anti-friction bearings 64 and 65 with the head of the bolt 43 engaging the inner race of the anti-friction bearing 64. A self-locking nut 70 threadably mounted on a reduced threaded portion 7 of the shoulder bolt 43 tightly engages the outer surface of the inner race of the anti-friction bearing 65 and serves to clamp the gears 41 and 45 between the proximal surfaces of the inner races of the ant. friction bearings 64 and 65. The sliding fit of the bearing 65 permits the gears 41 and 45 to be securely clamped on the stud 43 regardless of variations in the thickness of the gears.

It is thus seen that I have provided an improved change gear bracket having means for rotatably supporting the stud or shoulder bolt 43 at each of its ends adjacent the remote surfaces of the change gears 41 and 45. This bracket may be attached to the conventional parts of the machine in the same manner as the conventional types of change gear brackets which have heretofore been provided with only a cantilevered stud thereon. By loosening the nut 70, the shoulder bolt or stud 43 may readily be removed from the bearings 64 and 65 to facilitate mounting change gears of different sizes thereon, in which instance the gear 46 would be changed to maintain a constant distance between the stud 43 and the intermediate roll shaft 15.

The provision of a substantialy U-shaped bracket with two supporting leg portions permits the use of anti-friction bearings for the stud 43 which greatly increases the life of the stud 43. This also gives greater and more even support to the gears 41 and 45 to permit them to be more accurately adjusted relative to the gears 40 and 46 and greatly reducing the wear thereof.

In the drawings and specification there has been set forth a preferred embodiment of the invention and although specific terms are employed, they are used in a descriptive and generic sense only, and not for purposes of limitation, the scope of the invention being defined in the claims.

I claim:

1. A change gear bracket for spinning machine and the like adapted to be secured to a standard on said machine and serving to support change gears comprising a generally U-shaped member having a web portion and two extending parallel leg portions, said leg portions each having a bore therein, a stud rotatably mounted in said bores, means for securing the change gears on said stud between the leg portions of said bracket and means on said U-shaped member for securing said bracket to said machine.

2. A change gear bracket for spinning machines and the like adapted to be secured to a standard on said machine and serving to support change gears comprising a U-shaped member having a web portion and two extending parallel leg portions, each of said leg portions having a bore therein, said bores being in axial alinement, an anti-friction bearing mounted in each of said bores, a stud rotatably mounted in said anti-friction bearings, means for securing the change gears on said stud between the leg portions of said bracket and an extending member on said U-shaped member for securing said bracket to said machine.

3. A change gear bracket for spinning machines and the like adapted to be secured to a standard on said machine and serving to support change gears comprising a U-shaped member having a web portion and two extending parallel leg portions, each of said leg portions having a bore therein, said bores being in axial alinement, an anti-friction bearing mounted in each of said bores, a stud rotatably mounted in said anti-friction bearings, means for securing the change gears on said stud between the leg portions of said bracket, an extension on one of said leg portions, and said extension having a second bore therein for additionally securing the bracket to the spinning machine.

4. A change gear bracket for spinning machines and the like adapted to be secured to a standard on said machine and serving to support change gears comprising a U-shaped member having a web portion and two extending parallel leg portions, each of said leg portions having a bore therein, said bores being in axial alinement, an anti-friction bearing mounted in each of said bores, a stud rotatably mounted in said anti-friction bearings, means for securing the change gears on said stud between the leg portions of said bracket, an extension on one of said leg portions, said extension having a second bore therein for additionally securing the bracket to the spinning machine, a second extension on said leg portion having the first extension thereon, and said second extension having openings therein for securing the bracket to the standard.

5. A change gear bracket for spinning machines and the like adapted to be secured to a standard on one of said machines and serving to support change gears comprising a generally U-shaped member having a web portion and two extending parallel leg portions, each of said leg portions having a bore therein, said bores being in alinement, an anti-friction bearing fixedly mounted in one of said bores, another anti-friction bearing slidably mounted in the other of said bores, a stud rotatably mounted in said anti-friction bearings, means for securing the change gears on said stud between the leg portions of said bracket and an extending member on said U-shaped member for securing said bracket to said machine.

6. In a spinning machine and the like having change gears and other gears meshing with the change gears and a standard extending above said change gears, an improved means for supporting the change gears comprising a bracket having a first relatively wide leg portion secured at its upper end to said standard, a web portion integral with and extending at right angle from the first leg portion of the bracket, a second leg portion integral with said web portion and disposed in spaced parallel relation to said first web portion, said leg portions having axially alined bores therein, an anti-friction bearing disposed in each of said bores, a stud mounted in and extending between said anti-friction bearings for rotation therein, means for securing said change gears on the stud between said anti-friction bearings and an extending member on said U-shaped member for securing said bracket to said machine.

References Cited in the file of this patent
UNITED STATES PATENTS

| | | |
|---|---|---|
| 717,576 | Holst | Jan. 6, 1903 |
| 2,095,370 | Reama et al. | Oct. 12, 1937 |
| 2,490,544 | Robinson | Dec. 6, 1949 |
| 2,532,275 | Whittaker | Nov. 27, 1950 |
| 2,543,374 | Noguera | Feb. 27, 1951 |
| 2,669,881 | Skidmore | Feb. 23, 1954 |